Jan. 6, 1931.  C. STROBEL  1,788,175
GLASS CUTTING TOOL
Filed Jan. 6, 1928
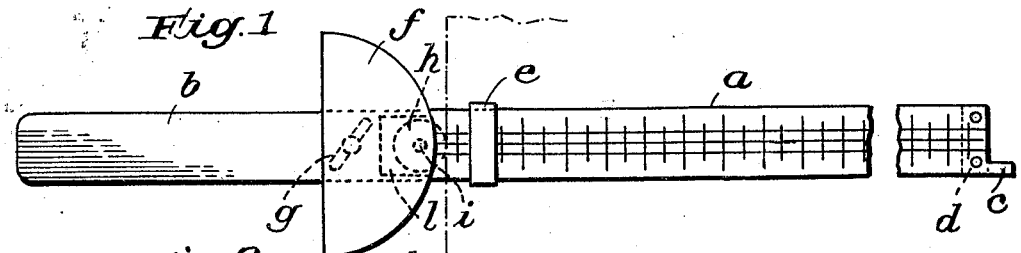
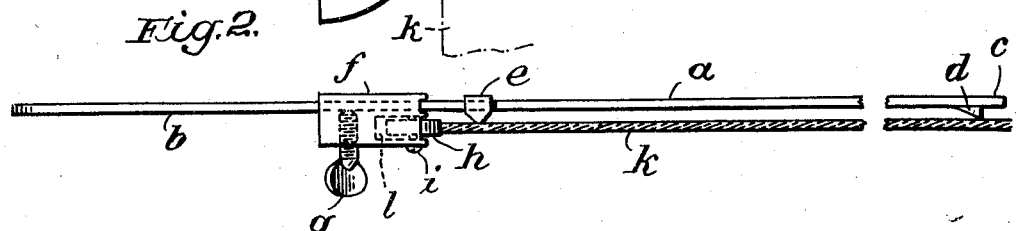
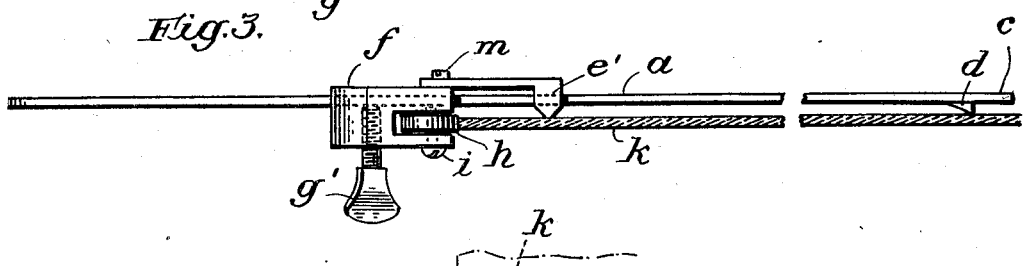
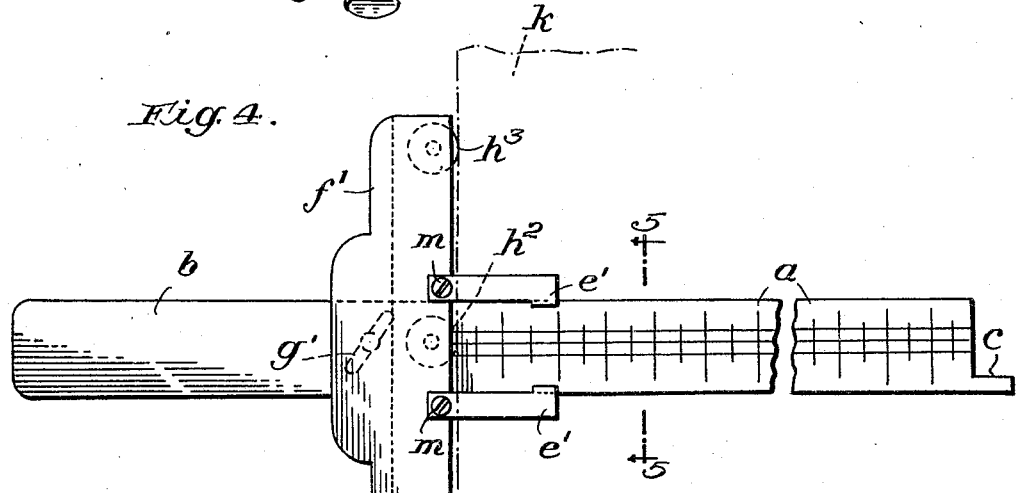
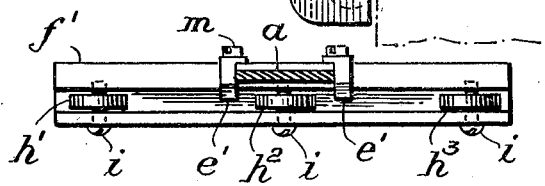
Inventor:
Carl Strobel
by C. P. Goepel
his Attorney.

Patented Jan. 6, 1931

1,788,175

UNITED STATES PATENT OFFICE

CARL STROBEL, OF CUXHAVEN, GERMANY

GLASS-CUTTING TOOL

Application filed January 6, 1928, Serial No. 244,828, and in Germany January 6, 1927.

The main object of my invention is to provide a new and improved glass-cutting tool, which is simple and durable in construction and adapted to be easily manipulated.

A further object of my invention is to provide means whereby the glass may be cut with exactly parallel edges.

A further object of my invention is to provide means, whereby with small cost and trouble certain parts of my glass-cutting tool when worn out may be replaced by new ones.

With these and others objects in view I have constructed my new glass-cutting tool, which now shall be fully described.

In the drawings: Fig. 1 is a top view of my improved tool, Fig. 2 is a side elevation thereof, Fig. 3 is the side elevation of a modification embodying my invention, Fig. 4 is a top view of the modification shown in Fig. 3 and Fig. 5 is a transverse section along the line 5—5 of Fig. 4.

By referring first to Figs. 1 and 2 it will be seen that $a$ designates a graduated blade, the left end $b$ of which serves as a handle. The right hand end of the blade $a$ has an extension $c$, to receive the glass cutter. The glass cutter may be disposed adjacent the extension $c$, so that both the extension and the glass cutter are in engagement. In this way the glass cutter is surely held but is not prevented from swinging a little. Adjacent to the right or free end of the blade $a$ is a body $d$ and slidably arranged on the blade $a$ is a body $e$. When the device is used the blade is laid on a glass plate, resting upon the projections $e'$ and $d$, and the glass cutter is held against the extension $c$ and the blade and cutter are moved together to cause the cutter to score the surface of the glass in the usual manner.

Likewise slidably arranged on the blade $a$ is a sliding head $f$. This sliding head $f$ is adapted to be fixed in any desired position on the blade $a$ by means of a screw $g$. The sliding head $f$ is formed on its right side semicircularly and provided with a notch $l$. A pin or screw $i$ fixed in the notch serves as an axis for a roller $h$ of hard rubber or the like. The glass plate $k$ to be cut is only contacted by the parts $h$, $e$ and $d$, so that a very small friction results, when the glass cutter is moved over the glass plate $k$.

In the modification shown in Figs. 3–5, the sliding head $f_1$, which may be fixed in any desired position relative to the blade $a$ by means of a screw $g^1$ has another form and supports three rollers $h^1$, $h^2$, $h^3$. These rollers are all in contact with the glass plate to be cut, so that the glass plate is cut with parallel edges. Integral with or fixed to the sliding head $f^1$ are two bodies $e^1$, which are grooved at their ends to receive the opposite edges of the blade $a$, and the lower faces of the ends extend below the blade $a$ to rest upon the glass plate $k$ the same as the part $e$ above mentioned. I prefer to fix the bodies $e^1$ to the body $f^1$ by screws $m$ and to hold the rollers $h^1$, $h^2$, $h^3$ by screws $i$, so that the rollers $h^1$, $h^2$ $h^3$ and the bodies $e^1$ when worn out may be easily replaced.

One of the advantages of my glass cutter is its small weight and a further advantage is its ease of manipulation.

When the body $f^1$ is adjusted, the work can be done with great rapidity and without interruption, because it is not necessary to lay the cutter from the hand, when a series of glass plates are to be cut.

What I claim is:

1. In a glass cutting tool, a blade and a head slidably fitted together, said head being adapted to engage the edge of a glass plate to be cut, an extension at one end of the blade continuing one edge thereof and adapted to be engaged by a glass cutter to be moved with the blade, a projection at the end of the blade at one side surface thereof and adjacent said extension, said projection being adapted to engage with the surface of the glass plate as the blade and cutter are moved together.

2. In a glass cutting tool, a blade and a head slidably fitted together, said head being adapted to engage the edge of a glass plate to be cut, a body slidable along the blade, an extension at one end of the blade continuing one edge thereof and adapted to be engaged by a glass cutter to be moved with the blade, a projection at the end of the blade at one side surface thereof and adjacent said extension, said body and projection being adapted each to engage with the surface of the glass plate as the blade and cutter are moved together.

3. In a glass cutting tool, a blade, two bodies associated therewith, one comprising a head in which the blade has sliding connection, means carried by the head for engaging the edge of a glass plate to be cut, the other body comprising a rest adapted to engage upon the surface of the glass plate, and an extension at one end of the blade continuing one edge thereof and adapted to be engaged by a glass cutter to be moved with the blade.

In testimony that I claim the foregoing as my invention, I have signed my name.

CARL STROBEL.